United States Patent [19]

Tisbo et al.

[11] E Patent Number: Re. 32,510

[45] Reissued Date of Patent: Sep. 29, 1987

[54] HOSE STORAGE APPARATUS

[75] Inventors: Cosmo N. Tisbo, Lake Barrington Shores; Thomas A. Tisbo, Barrington; Richard D. Recker; Bruce Heggeland, both of Palatine, all of Ill.

[73] Assignee: Suncast Corporation, Ill.

[21] Appl. No.: 925,692

[22] Filed: Oct. 29, 1986

Related U.S. Patent Documents

Reissue of:

[64] Patent No.: 4,512,361
Issued: Apr. 23, 1985
Appl. No.: 445,100
Filed: Nov. 29, 1982

[51] Int. Cl.[4] ..... B65H 75/34

[52] U.S. Cl. ..... 137/355.27; 242/86; 248/76; 137/580; 277/65

[58] Field of Search ..... 137/355.26, 355.2, 355.27, 137/355.12, 899, 899.3, 580; 242/86; 248/75–80; 285/281

[56] References Cited

U.S. PATENT DOCUMENTS

| | | | |
|---|---|---|---|
| 226,012 | 3/1880 | Aiken | 137/355.12 |
| 706,968 | 8/1902 | Mond | 137/355.26 |
| 1,117,357 | 11/1914 | Esser | 137/355.21 |
| 1,489,398 | 4/1924 | Paul | 137/355.27 |
| 1,499,644 | 7/1924 | Dowrelio | 242/86 |
| 1,612,206 | 12/1926 | Nicholson | 137/355.19 |
| 1,851,076 | 3/1932 | Ackerman | 277/65 |
| 2,547,826 | 4/1951 | Kirschner | 299/78 |
| 2,629,630 | 2/1953 | Roark | 299/78 |
| 2,642,312 | 6/1953 | Shine | 299/78 |
| 2,823,074 | 2/1958 | Bernard, Jr. | 137/355.26 |
| 2,918,975 | 12/1959 | Conery et al. | 137/355.12 |
| 3,110,453 | 11/1963 | Becker et al. | 242/86 |
| 3,388,716 | 6/1968 | Wilson | 137/355.22 |
| 3,407,836 | 10/1968 | Keiser | 137/899.3 |
| 3,433,247 | 3/1969 | Haselden | 137/355.26 |
| 3,587,626 | 6/1971 | Cowley | 137/355.12 |
| 4,041,974 | 8/1977 | Keiser | 137/899.3 |
| 4,137,939 | 2/1979 | Chow | 137/355.27 |
| 4,224,960 | 9/1980 | Nedermon | 137/355.26 |
| 4,315,522 | 2/1982 | Brown | 137/355.27 |

FOREIGN PATENT DOCUMENTS

| | | | |
|---|---|---|---|
| 1029821 | 5/1966 | United Kingdom . | |
| 1378032 | 6/1972 | United Kingdom | 137/355.23 |

OTHER PUBLICATIONS

*Hose Reels*, "To Handle Hose for Industrial Application", catalog H-7612-ID, Hannay Reels, Clifford B. Hannay & Sons, Inc., Westerlo, NY 12193.

*Primary Examiner*—A. Michael Chambers

[57] ABSTRACT

A hose storage apparatus for storing and transporting a hose on a reel. The reel is rotatably mounted on a frame which is formed of a plastic material. The frame has a molded plastic handle pivotally attached thereto. The handle is positionable in an upright attitude to provide a convenient means for manipulating the apparatus. The handle may be selectively lowered to a lowered position wherein portions of the handle are positioned adjacent to the frame to reduce the height of the apparatus and thereby facilitate storage. A lock releasably secures the handle to the frame in a selected attitude. The reel includes a pair of identical molded plastic reel halves. Each half includes a reel side with a hub. Each hub is rotatably mounted in the frame. A plurality of pylons is formed integral with each of the reel sides. The pylons of each reel side are secured to each other and form a hose support surface. A hose connector is mounted on one reel side. The hose connector has a molded plastic inlet tube rotatably mounted on the hub of said side. A molded plastic outlet tube is also mounted on the same hub and is connected to the inlet tube. The tube is fixed relative to the hose support surface and is adapted to be connected to a hose stored on the hose support surface.

17 Claims, 15 Drawing Figures

PUSH
80
84
86
60
5
112
110
100
108
98
106
102
104
105
54
48
92
24
88
6
128
26
86
54
126
204
II
212
22
124
56
72
210
46
44
32

FIG. 7
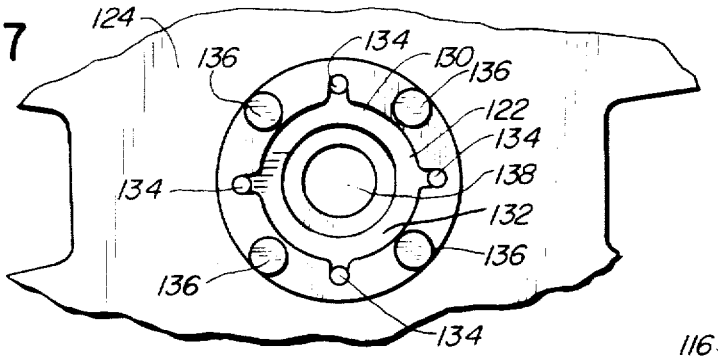
FIG. 6
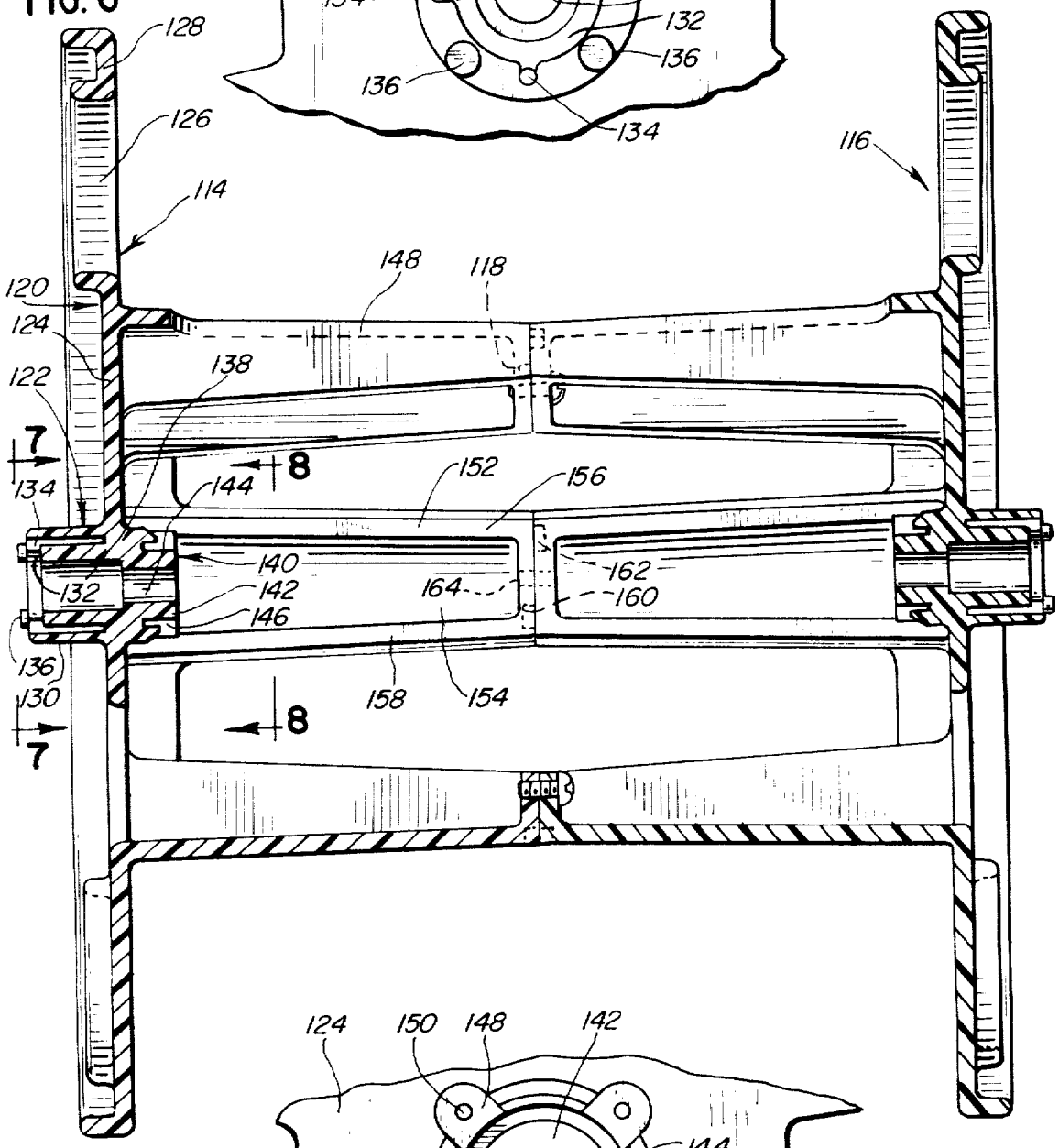
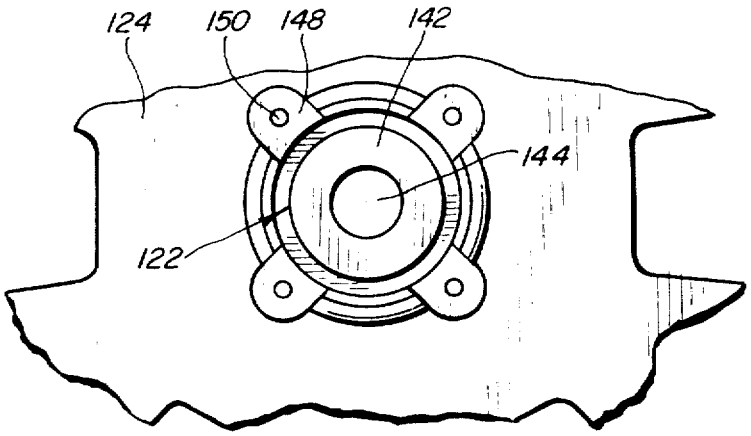
FIG. 8

FIG. 9
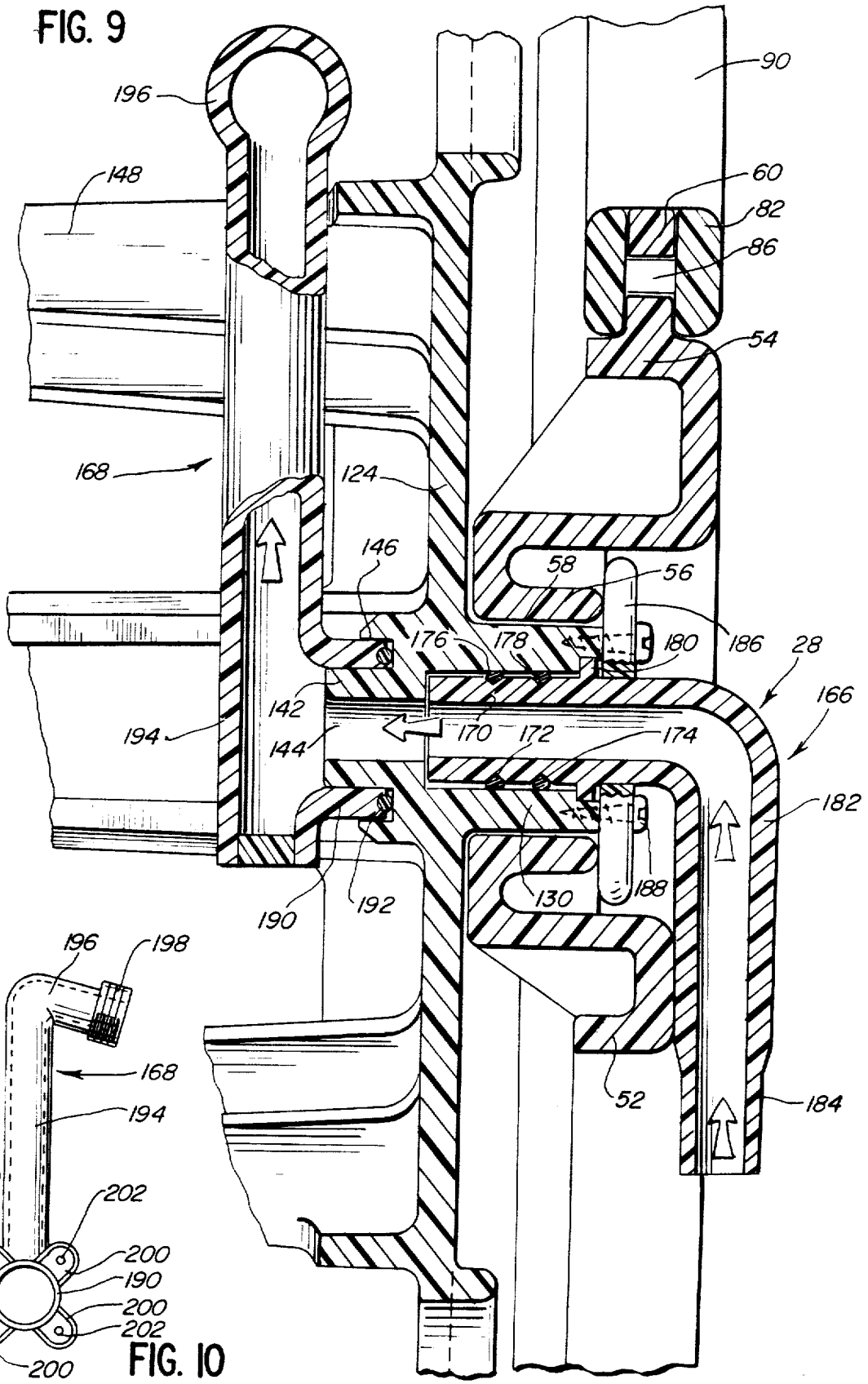
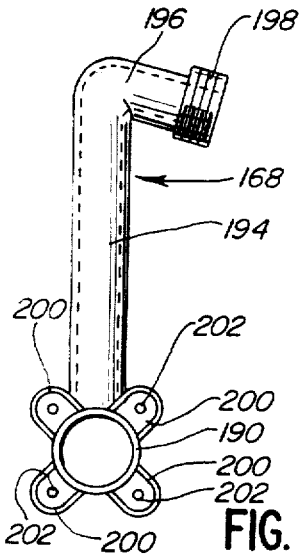
FIG. 10

FIG. 11
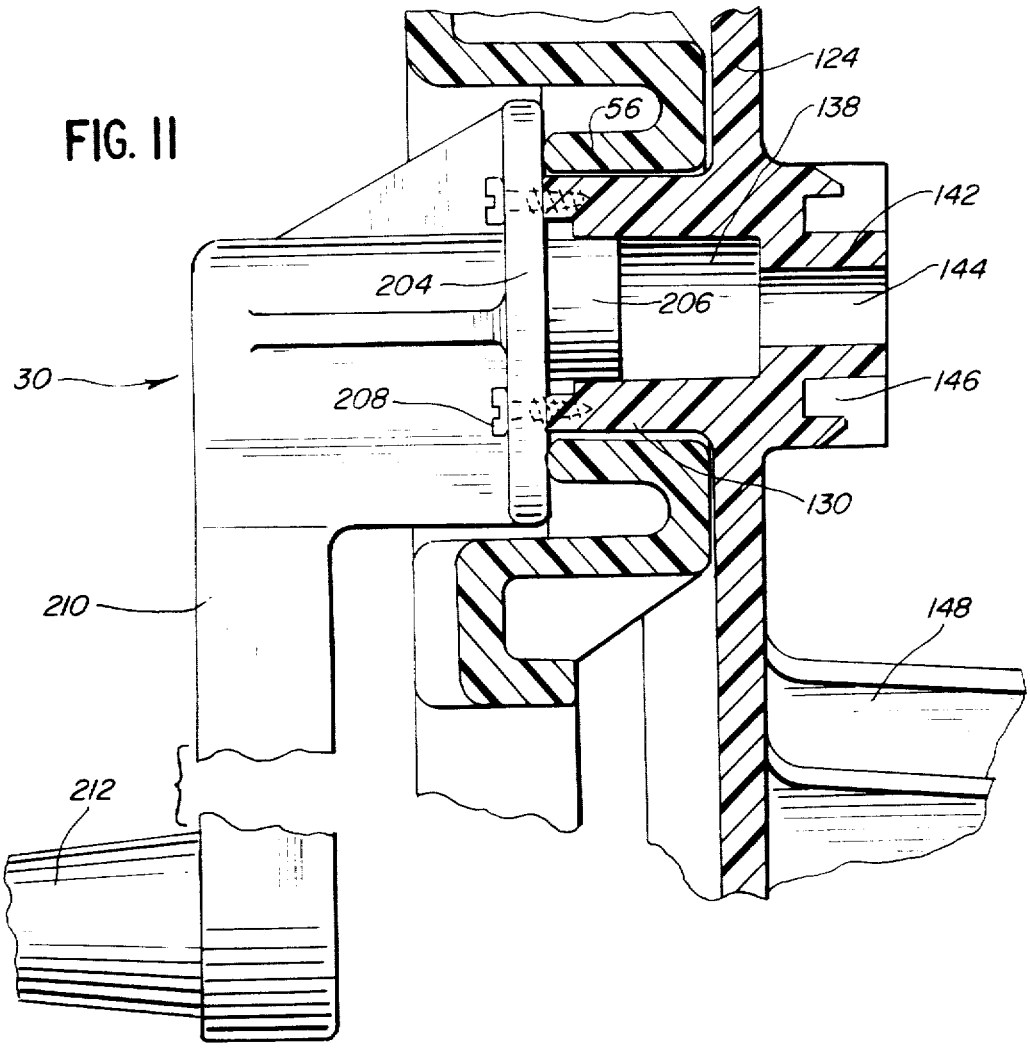
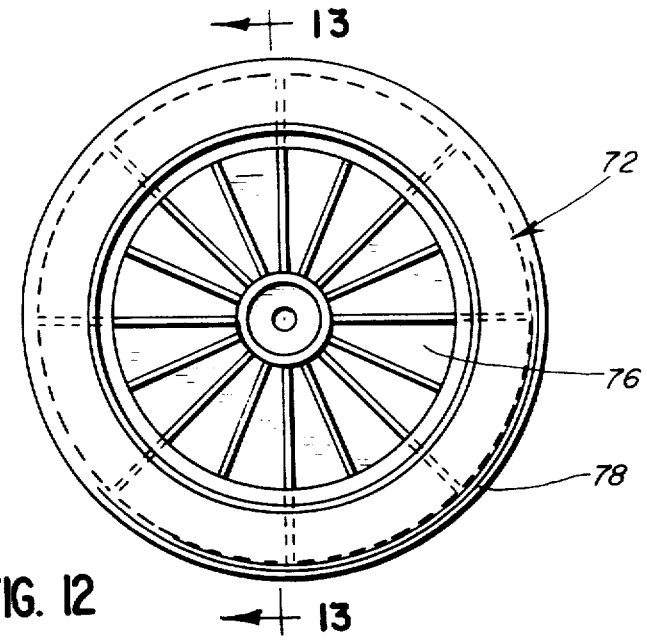
FIG. 12
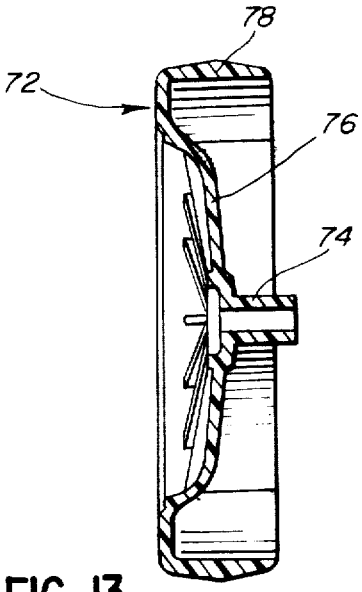
FIG. 13

HOSE STORAGE APPARATUS

Matter enclosed in heavy brackets [ ] appears in the original patent but forms no part of this reissue specification; matter printed in italics indicates the additions made by reissue.

BACKGROUND OF THE INVENTION

It is generally recognized that in many instances it is desirable to provide a means for storing a hose, such as a garden hose. It may not be necessary to use a hose at a considerable distance from a water source. In many application, it is only necessary to use a hose a short distance from the water source and then in another instance, use the hose a different distance from the water source. Accordingly, it is desirable to provide a means for storing the hose with a free end which may have a nozzle attached thereto or may be adapted to be connected to another piece of equipment, such as a lawn sprinkler. The inlet to the hose should be connected to a source of fluid, such as, water, so that a selected length of hose may be removed from the storage device and the hose may be utilized. A device which is well-known for providing a means for storing a hose and being capable of connecting the hose to a source of water is a garden hose reel shown in U.S. Pat. No. 2,642,312, issued June 16, 1953, to Thomas Shine. The Shine Patent teaches a hose reel wherein the inlet end of the hose may be secured to a source of water on the reel and the hose then may be wound onto the reel. This arrangement is perfectly advantageous for those arrangements wherein the hose may remain at a fixed location. However, when it is desirable to move the hose from one location to another, the Shine device does not lend itself to easy movement. Furthermore, it is to be noted that in the Shine device the weight of the hose and water is supported by the pipe which delivers the water.

An apparatus which provides a means for not only storing the hose, but also provides a means for transporting the hose is disclosed in U.S. Pat. No. 3,587,626 to William E. Cowley, which patent issued on June 28, 1971, and is entitled "Transportable Hose Reel." The Cowley patent discloses a reel for storing hose which reel also provides a support for the entire device. The reel is mounted in a handle which may be positioned on a supporting surface in a manner which allows the reel to rotate on the handle. The reel is connected to a water supply through a hose section which delivers water to the reel and then to the hose mounted on the reel.

U.S. Pat. No. 4,137,939 to Ho Chow, issued Feb. 6, 1979, entitled "Hose Reel Cart", teaches a construction for a hose reel cart wherein a handle also provides a frame for supporting a hose reel. The hose reel receives a hose, and the frame has a pair of wheels for movably supporting the cart during transfer from one location to another. Both the Chow and Cowley devices have their supports provide a double function in that the support for the reel also provides a conduit for the water. It has been found in practice that when a reel is supported by a conduit, gasket material in the reel tends to wear quickly and thereby allow leaks to develop. It has also been found that the heretofore known reels are made of metal which has a tendency to rust when a protective surface becomes damaged or is worn away through usage. The reel tends to become rusty and not rotate freely. Also, other parts tend to become inoperative due to rusting.

It is also to be noted that in many instance, it is desirable to store the entire apparatus with the hose on it in a minimum of space. The Shine device is adapted to be mounted on a pipe. Thuse, the Shine device must be removed for storage. As to the Cowley and Chow devices, the devices may be conveniently moved to a storage location. However, the upwardly extending handles tend to take up space needlessly.

SUMMARY OF THE PRESENT INVENTION

The present invention relates to an improved hose storage apparatus which is particularly adapted for windably storing an elongated flexible hose and transporting the entire apparatus. The apparatus includes a frame being formed of a molded plastic material. A generally U-shaped molded plastic handle is pivotally attached to the frame and is positionable from an upright position to a lowered position wherein a portion of the handle is adjacent to the frame for storage of the apparatus. A lock releasably secures the handle to the frame in a selected position. The apparatus includes a reel for windably receiving a hose. The reel includes a pair of molded plastic reel halves which are fixed to each other and rotatably mounted in the frame. Each reel half is identical to the other reel half. Each reel half includes a side having a hub rotatably mounted in the frame. A plurality of pylons is formed integral with each reel side, and the pylons of one reel side are secured to the pylons of the other reel side to secure the halves together. The pylons form a hose support surface. A hose connector is mounted on one of the reel sides. The hose connector includes a molded plastic inlet tube rotatably mounted in the hub of the reel side and a molded plastic outlet tube fixed to the hub and being connected to the inlet tube for receiving a fluid delivered to the inlet tube.

BRIEF DESCRIPTION OF THE DRAWINGS

FIG. 6 is an enlarged cross sectional view of a reel taken on line 6—6 of FIG. 2;

FIG. 7 is an enlarged fragmentary elevational view, of the exterior side of a hub of a reel side taken on line 7—7 of FIG. 6;

FIG. 8 is an enlarged fragmentary view of the interior side of the hub of FIG. 7 on line 8—8 of FIG. 6;

FIG. 9 is an enlarged cross sectional view of a portion of the reel and a hose connector secured to the hub;

FIG. 10 is a side elevational view of an outlet tube which is one of the elements of the hose connector;

FIG. 11 is an enlarged fragmentary cross sectional view taken on line 11—11 of FIG. 2 showing the attachment of a crank to a portion of the reel;

FIG. 12 is a side elevational view of a wheel of the subject apparatus;

FIG. 13 is a cross sectional view taken on line 13—13 of FIG. 12;

DESCRIPTION OF THE PREFERRED EMBODIMENT

Figure 1:
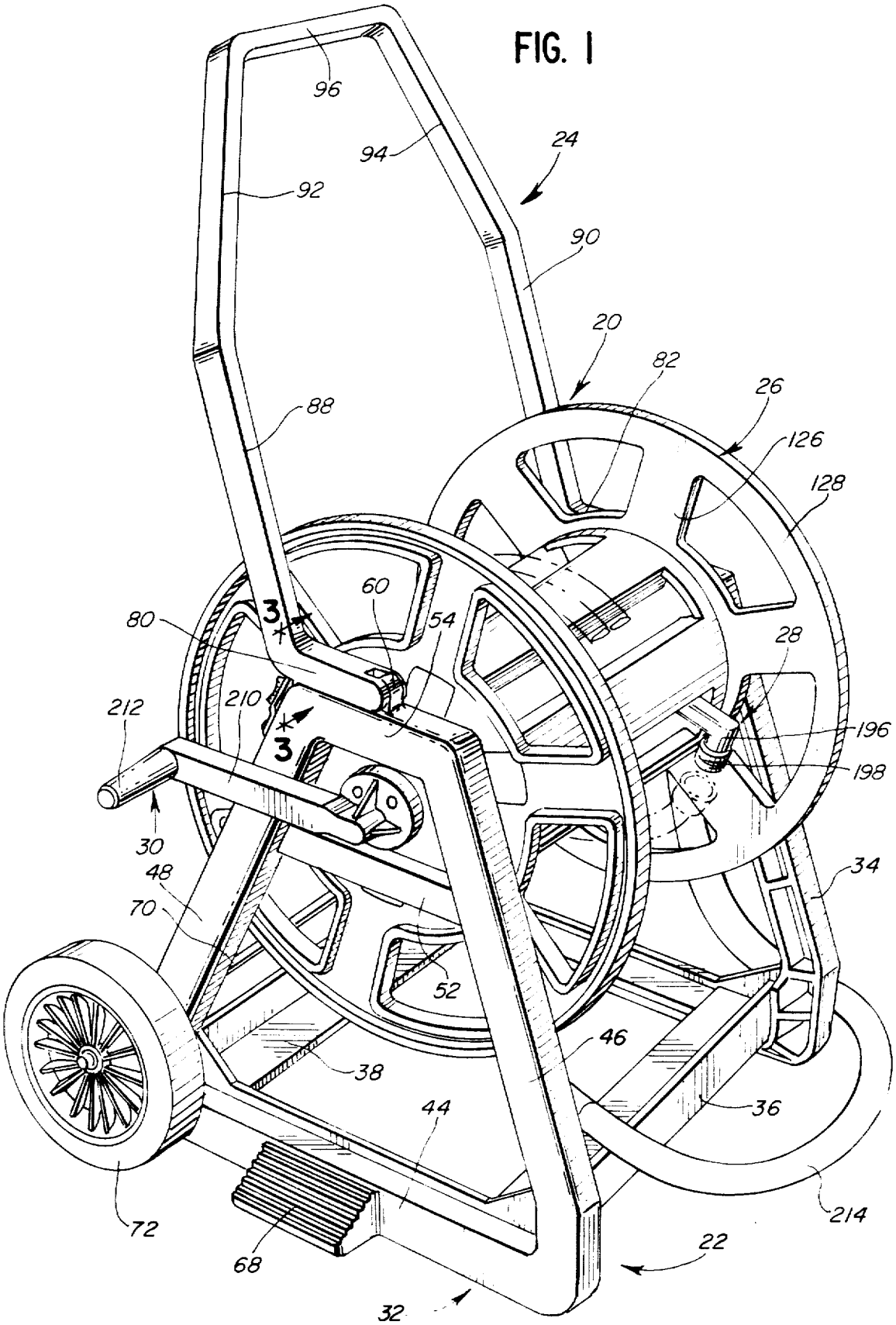
FIG. 1 is a perspective view of a hose storage apparatus embodying the herein disclosed invention.

Referring now to the drawings and especially to FIG. 1, a hose storage apparatus embodying the present invention, generally indicated by numeral 20, is shown therein. The hose storage apparatus includes a frame 22 with a handle 24 pivotally mounted on the frame. A reel 26 is rotatably mounted in the frame. A hose connector 28 is mounted on reel 26. A crank 30 is fixed to the reel for rotating the reel in the frame to wind a hose onto the reel.

Figure 14:
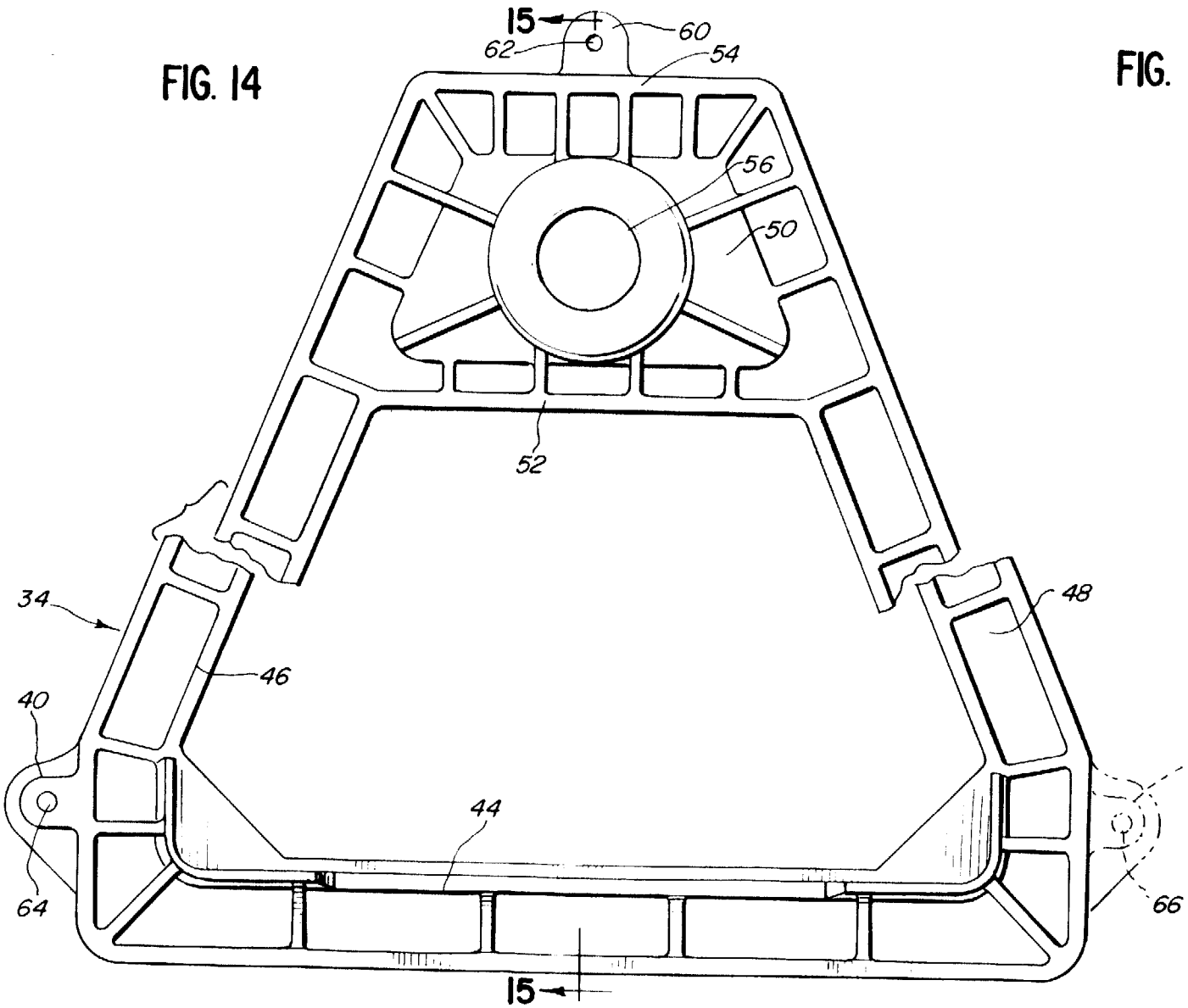
FIG. 14 is a fragmented side elevational view of an interior of a side frame of the instant apparatus.

The frame generally consists of a pair of molded polyethylene frame sides 32 and 34 which are connected by a polyethlene front cross bar 36 and a polyethylene rear cross bar 38. The frame sides 32 and 34 are identical in their construction, except for positioning of a wheel ear. Looking now to FIG. 14 which shows an interior side elevational view of a frame side, the frame side shown in FIG. 14 is frame side 34 which has a wheel ear 40 formed thereon and shown in solid form. A wheel ear 42 is shown in dotted form; and if wheel ear 40 were removed, and wheel ear 42 were included, then the frame side would be frame side 32. From the foregoing, it may be seen that the frame sides are identical, except for the wheel ears, and a description of one will suffice as a description of the other. Like numerals will be used for the same parts on both the frame sides.

The frame side is generally trapezoidal and includes a base 44. The base has a sloping upright side column 46, formed integral with one end and a sloping upright side column 48, formed integral with the opposite end. A head 50 is formed integral with the upright side columns 46 and 48. The head includes a lower beam 52 and an upper beam 54. A reel journal bearing 56 is formed in the head. As may be more clearly seen in FIG. 9, the reel journal bearing 56 has a bearing surface 58 which is particularly adapted for receiving a reel journal, as will be described in detail hereinafter. A handle ear 60 is formed integral with top beam 54. The ear includes a [hnadle] *handle* shaft aperture 62. The wheel ears 40 and 42 include wheel axle apetures 64 and 66 to receive a wheel axle. As may be best seen in FIG. 1, a step 68, is formed integral with base 44 and extends outwardly from the frame to provide a convenient means for holding and steadying the apparatus.

A wheel axle 70 is mounted in apertures 64 and 66 of ears 40 and 42, respectively. A pair of identical molded polyethylene wheels 72 is mounted on the axle. As may be seen in FIGS. 12 and 13, each of the wheels 72 includes a wheel hub 74 which is rotatably mounted on the wheel axle. The wheel hub has a wheel flange 76 formed integral therewith. A wheel tire 78 is formed integral with the flange to complete the wheel.

Handle 24 is a generally U-shaped handle which is a single molded polyethylene part. The handle includes a pair of lateral bars 80 and 82, each of which contains a slot 84 to receive a handle ear 60. A pivot pin 86 is mounted in the lateral bar and pivots in ear 60. A pair of uprights 88 and 90 is formed integral with lateral bars 80 and 82, respectively. Side bars 92 and 94 are formed integral with uprights 88 and 90, respectively. A handle bar 96 has its opposite ends formed integral with side bars 92 and 94 to complete the handle.

Figures 2, 3, 4, 5:
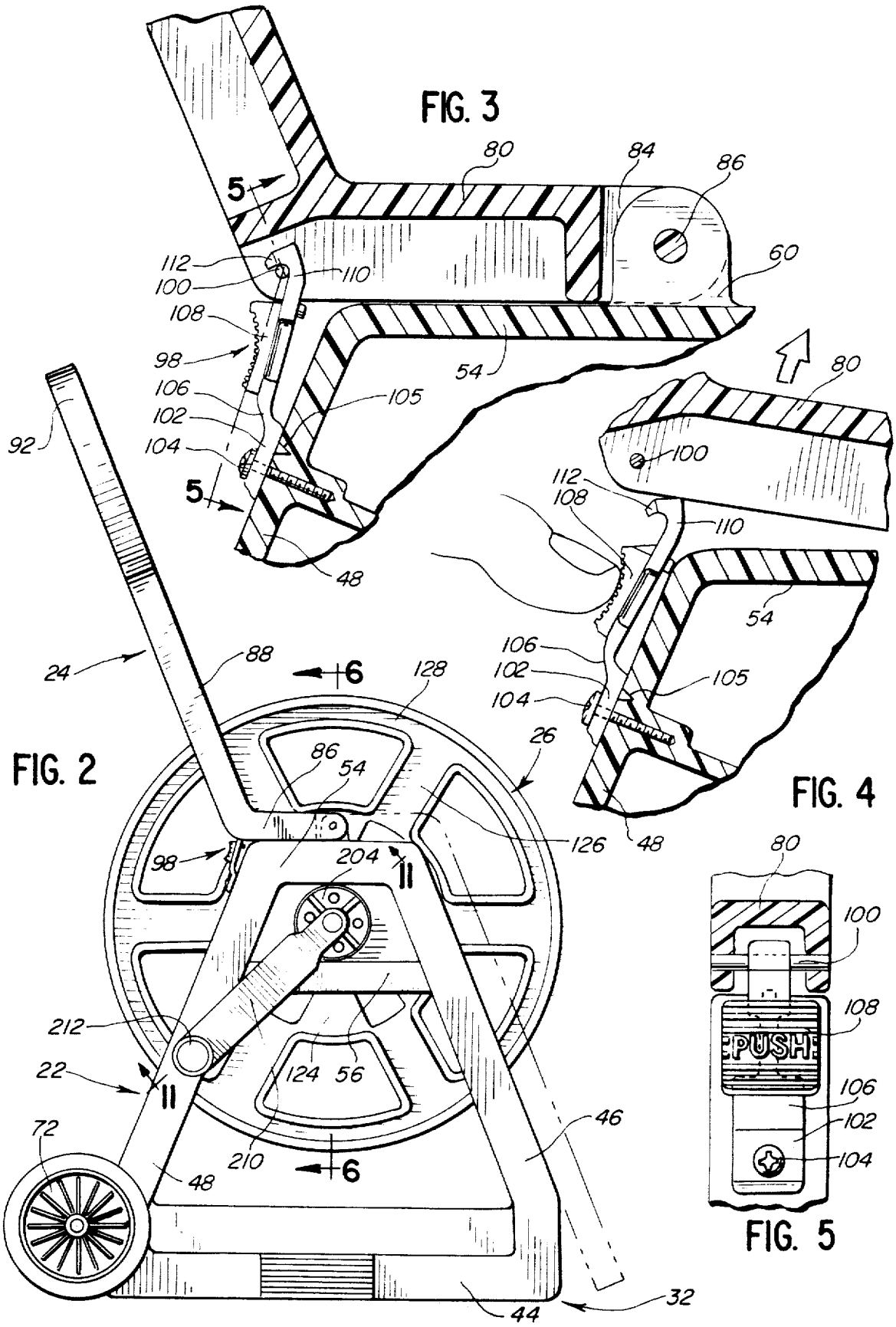
FIG. 2 is a side elevational view of the hose storage apparatus of FIG. 1 showing a handle locked in a raised or upright position and the same handle shown in dotted form in a lowered position.
FIG. 3 is an enlarged fragmentary cross sectional view taken on line 3—3 of FIG. 1 showing a portion of the handle and a portion of the frame and a lock securing the handle to the frame.
FIG. 4 is similar to FIG. 3 but showing the lock in a released attitude with the handle in a partially pivoted position.
FIG. 5 is an enlarged cross sectional view taken on line 5—5 of FIG. 3 showing the lock.
Figure 15:
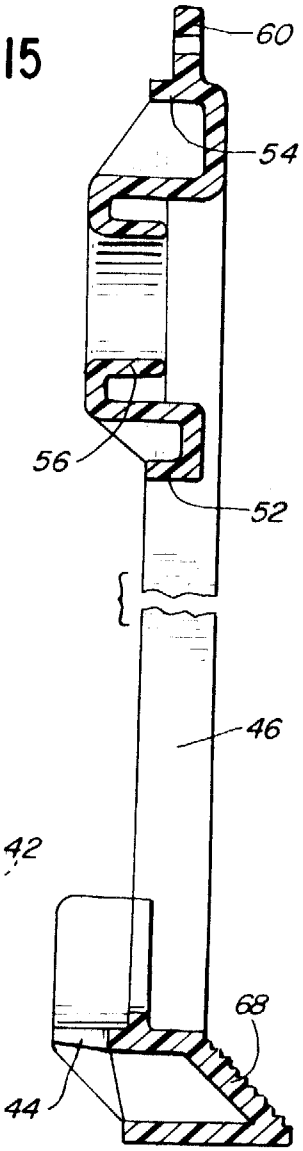
FIG. 15 is a cross sectional view taken on line 15—15 of FIG. 14.

A pair of identical locks 98, releasably secures the handle to the frame in an upright position. Each of the lateral bars 80 and 82 contains a lock rod 100, which is engaged by one of the locks 98. Since the locks are identical, only one of the locks is described in detail and shown in FIGS. 3, 4, and 5. Each lock 98 includes a lock base 102 which is secured to its respective portion of the frame by a lock screw 104. A point 105 is formed integral with the lock base to prevent the lock base from rotating. The lock base has a resilient section 106 formed integral therewith. A push plate 108 is also formed integral with the resilient section. A head 110 is secured to the push plate which head has a hook 112. Each hook engages and passes over the respected rod 100 to secure each side of the handle to the frame.

Reel 26 is made up of two identical molded polyethylene reel halves 114 and 116 which reel halves are secured to each other by conventional screws 118. Inasmuch as the reel halves are identical in construction, the same numbers are used for each of the individual parts of the reel halves.

Each reel half includes a reel side 120 which includes a hub 122. A flat side wall 124 is formed integral with the hub and a plurality of identical spokes 126 is formed integral with the flat side wall. A rim 128 formed integral with the spokes forms the outer periphery of the reel half. The hub contains a journal 130 with a flange recess 132 formed therein. Four axial screw apertures 134 are formed on the outer end of the journal. The journal includes a journal apeture 138 adapted to receive a portion of the hose connector. The hub also includes an outlet mount 140. The outlet mount includes an axially extending stud 142 with an axial aperture 144, which has its axis aligned with aperture 138. A sealing groove 146 is formed around the stud. Four identical equiangularly spaced fastner pads 148 are formed integral with and around the stud. Each of the pads includes a screw aperture 150.

Six identical pylons 152 are formed integral with side wall 124 and extend inwardly of the side wall. Each pylon includes an outer wall 154 with a pair of side walls 156 and 158 formed integral with the outer wall. A connector plate 160 is formed integral with the free ends of the outer wall and the side walls. A pylon lug 162 is formed integral with each connector plate. Each connector plate contains a lug aperture 164 for positioning the respective pylons relative to each other by receiving a pylon lug from an opposed pylon.

As was mentioned above, the pylons are riveted to each other. The screws are driven through connector plates 160 to secure the reel halves together. The outer walls of the pylons provided an outer surface for receiving a hose on the reel. The pylons also provide a means for connecting the reel sides to each other.

Hose connector 28 may be best seen in FIG. 9. The hose connector includes a molded polyethylene inlet tube 166, and a molded polyethylene outlet tube 168. Inlet tube 166 includes a horizontal tube 170 which is mounted in the journal apeture. Tube 170 has a pair of O-ring grooves 172 and 174 which have O-rings 176 and 178, respectively, mounted therein, for engagement with the interior of the journal to form a seal between tube 170 and the journal. A flange 180 is formed integral with the horizontal tube, and the flange is positioned in the flange recess. An outer tube 182 is formed integral with horizontal tube 170. The outer tube contains a reduced portion 184 to receive an inlet hose on the outer tube. A lock plate 186 contains a tube plate aperture and rotatably receives horizontal tube 170. A plurality of screws 188 secures the plate to the journal and thereby holds the inlet tube in the journal.

The outlet tube includes a mounting chimney 190 which is positioned in the sealing groove 146 and receives stud 142. An O-ring 192 is positioned on the end of the chimney to form a seal between the end of the chimney and the outlet mount. A radial tube 194 is formed integral with chimney 190 and extends radially outward from the outlet mount. A surface tube 196 is formed integral with the radial tube and has a male hose fitting 198 on the end of the surface tube. As may be seen in FIG. 9, the surface tube extends beyond the surface of the hose surface formed by the outer walls of the pylons. Outlet tube 168 includes four identical mounting ears 200 with a screw aperture 202 formed in each ear 200. The mounting ears are equiangularly spaced and match with the fastener pads 148 so that the ears may be secured to the fastener pads by conventional screws. It may be seen in FIG. 9 how a fluid, such as, water, entering the inlet tube flows along the inlet tube through the hub and into the outlet tube to be delivered to a hose which is connected to the male fitting.

Crank 30, which is molded polyethylene, may be best seen in FIG. 11. Crank 30 includes a mounting plate 204 which has a crank stud 206 formed therein which stud 206 fits into the journal. The mounting plate has a crank arm 210 formed integral therewith, and a crank handle 212 is formed integral with the arm 210.

The instant device may be economically manufactured in view of the fact that the reel is made of two identical molded polyethylene reel halves which are held together by screws. Since the reel is made of polyethylene, it does not corrode when exposed to water and air. The construction is such that the reel includes journals which fit into the frame. It is important to note that the weight of the hose, water and reel rests on the journals. The source of water to a hose which is mounted on the reel is through a conventional connector, or inlet hose 214 which is connected to the inlet tube. The water flows through the inlet tube through the hub and into outlet tube 162. It is to be noted that there is no load on the inlet tube. Thus, there is no undue wear of O-rings 176 and 178 which form the seals between the inlet tube and the journal.

It is also to be noted that handle 24 may be conveniently lowered to provide a low storage profile for the apparatus after a hose has been placed on the reel. The end of the stored hose is connected to the outlet tube. Crank 30 is used to wind the hose onto the reel. During the winding operation, the operator may place his foot on step 68 in order to steady the apparatus. After the hose has been wound onto the reel, the hose may be transported simply by pulling down on the handle to tilt the frame, and wheeling the apparatus on wheels 72.

In order to store the apparatus in a limited space, the handle may be folded down. The handle is released from the frame simply by pressing on the press plates 108 to release the hooks from the rods. The handle then may be folded down to the attitude shown in dotted form in FIG. 2, wherein lateral bars 82 and 84 rest on the respective upper beams and uprights 88 and 90 lie along respective sloping upright of the frame. Thus, the apparatus provides a low profile for storage in a limited space. When it is necessary to utilize the handle again, it is a simple matter to pivot the handle about the ears until the rods engage the respective handle locks thereby securing the handle in its upright attitude with the lower side of each of the lateral bars in engagement with the respective upper beams.

From the foregoing, it may be seen that substantially all of the parts are of a durable plastic material which does not rust when exposed to water and air. Therefore, the device has a long life and also is lightweight so that it may be handled easily and conveniently.

Although a specific embodiment of the herein disclosure invention has been shown and described in detail, it is to be expressly understood that the instant invention is limited only by the appended claims.

What is claimed is:

[1. A hose storage appartus for windably storing an elongated flexible hose comprising: a frame formed of a moldable plastic material;

a reel for windably receiving an elongated flexible hose, said reel being formed of a moldable plastic material, said reel being rotatably mounted on the frame, said reel including a pair of connected reel sides, each of said reel sides including a hub rotatably mounted in the frame, said reel including a hose support surface connecting the reel sides;

and a hose connector mounted on the reel, said hose connector having an inlet tube rotatably mounted in the hub of one of said sides and an outlet tube having one end adapted for attachment to a hose windably mounted on the hose support surface, said outlet tube fixed relative to the hose support surface and being connected to the inlet tube to receive a fluid delivered to the inlet tube.]

2. A [hose storage apparatus for windably storing an elongated flexible hose,] *cart* as defined in claim [1:] *27* wherein said reel is formed of two identical halves.

3. A [hose storage apparatus for windably storing an elongated flexible hose] *cart* as defined in claim [1,] *27* including:

a crank secured to the hub of the other said side for rotating the reel in the frame.

4. A [hose storage apparatus for windably storing an elongated flexible hose] *cart* as defined in claim [1:] *27* wherein each of the reel sides has a plurality of pylons formed integral with the sides, and fastening means securing the pylons of one of the sides to the pylons of the other of the sides to form the reel.

5. A [hose storage apparatus for windably storing an elongated flexible hose] *cart* as defined in claim [1,] *27* including:

a handle pivotally attached to the frame and being positionable from an upright position to a lowered position to facilitate storage of the [storage apparatus] *cart,* said handle in an upright position cooperative with the frame to provide a convenient means for manipulating the hose storage apparatus, said handle being formed of a moldable plastic material, and a lock for releasably securing the handle in a selected position.

[6. A hose storage apparatus for windably storing an elongated flexible hose as defined in claim 1 including:

a handle pivotally attached to the frame, said handle having a free end adjacent to one edge of the frame, said handle being positionable from an upright position to a lowered position to facilitate storage of the storage apparatus, said handle being formed of a moldable plastic material, a lock for releasably securing the handle in its upright position.

and a pair of wheels rotatably mounted on the frame adjacent to the edge of the frame which the free end of the handle is adjacent to provide a convenient means for moving the hose storage apparatus.]

[7. A hose storage apparatus for windably storing an elongated flexible hose as defined in claim 1, wherein the inlet tube includes:

a horizontal tube rotably mounted in the hub of the one of said sides, an O-ring mounted on the horizontal tube contacting the hub to form a seal therebetween, a flange formed integral with the horizontal tube and engageable with the hub, an outer tube formed integral with the horizontal tube, said outer tube being adapted for connection to an inlet hose, and a lock plate mounted on the hub and engageable with the flange to hold the inlet tube in the hub.]

8. A [hose storage apparatus for windably storing an elongated flexible hose] *cart* as defined in claim [1:] *27* wherein the outlet tube includes, a mounting chimney in engagement with the hub and communicating with the inlet tube, a mounting ear formed integral with the mounting chimney and secured to the hub to fix the outlet tube to the hub, a radial tube formed integral with the mounting chimney and communicating therewith, a surface tube formed integral with the radial tube, and a male hose fitting formed on the end of the surface tube for connection to a female fitting of a hose windably stored on the reel.

[9. A hose storage apparatus for windably storing an elongated flexible hose as defined in claim 1:

wherein each of said sides includes a plurality of identical pylons formed therewith, a pylon from each side being secured to a like pylon from each other side to secure the sides to each other, and said pylons defining the hose support surface;

said outlet tube including; a mounting chimney in engagement with the hub, a mounting ear formed integral with the mounting chimney for securing the outlet tube to the hub, a radial tube having one end formed integral with the mounting chimney and being connected to the inlet tube through the mounting chimney and the hub, a surface tube having one end formed integral with the radial tube, and a male hose fitting formed integral with the surface tube for receiving a female hose fitting of a hose windably stored on the reel.]

[10. A hose storage apparatus for windably storing an elongated flexible hose as defined in claim 1:

wherein each of said reel sides includes a plurality of pylons, said pylons on each of said sides being secured to like pylons on the other of said sides to complete the reel, and said pylons defining the hose support surface of the reel;

said inlet tube including; a horizontal tube rotatatably mounted in the hub, an outer tube having one end formed integral with the horizontal tube and the other end being adapted for attachment to an inlet hose, and a flange formed integral with the horizontal tube and being engageable with the hub;

and including an O-ring mounted in the hub in engagement with the horizontal tube to form a seal between the horizontal tube and the hub, and a lock plate mounted on the hub and rotatably receiving the inlet tube, said lock plate holding the flange in engagement with the hub to prevent removal of the inlet tube from the hub.]

[11. A hose storage apparatus for windably storing an elongated flexible hose as defined in claim 1:

wherein the reel sides are identical to each other;

said inlet tube includes; a horizontal tube rotatably mounted in the hub of one of said sides, an outer tube having one end formed integral with the horizontal tube and communication therewith, said outer tube having its other end, adapted for attachment to an inlet hose, and a flange formed integral with the horizontal tube and in engagement with the hub;

and including a lock plate secured to the hub receiving the inlet tube holding the flange of the inlet tube adjacent to the hub to secure the inlet tube in communication with the hub;

said outlet tube including, a mounting chimney connected to the other side of the hub.

a mounting ear formed integral with the mounting chimney and secured to the hub to secure the outlet tube to the hub, a radial tube having one end formed integral with the mounting chimney and communicating with the inlet tube through the mounting chimney and the hub, a surface tube having one end formed integral with the radial tube and communicating with the radial tube, and a male hose fitting formed on one end with the surface tube for connection to a female hose fitting of a hose windably stored on the reel.]

[12. A hose storage apparatus for windably storing an elongated flexible hose as defined in claim 1:

including a generally U-shaped handle having the ends of the "U" pivotally connected to the frame, said handle being pivotal from an upright position to a lowered stored position, a lock for releasably locking the handle in its upright position;

said inlet tube having, a horizontal tube rotatably mounted in the hub, an outer tube having one end formed integral with the horizontal tube and in communication therewith, said outer tube adapted for engagement with an inlet hose, and a flange formed integral with the horizontal tube and engageable with the hub;

and including a lock plate secured to the hub rotatably receiving the inlet tube and holding the flange adjacent to the hub to retain the inlet tube in communication with the hub;

and said outlet tube having a mounting chimney mounted on the other side of the hub, a mounting ear formed integral with the chimney for securing the outlet tube to the hub, a radial tube having one end formed integral with the mounting chimney and communicating with the inlet tube and the mounting chimney and the hub, and a surface tube having one end formed integral with the radial tube and being adapted for connection to a hose mounted on the reel.]

[13. A hose storage apparatus for windably storing an elongated flexible hose as defined in claim 1:

wherein the inlet tube includes; a horizontal tube rotatably mounted in the hub, a flange formed integral with the horizontal tube and engageable with the hub, an outer tube having one end formed integral with the horizontal tube and in communication therewith, and said outer tube being adapted for connection to a flexible inlet hose, and including an O-ring mounted between the horizontal tube and the hub for forming a seal therebetween, and a lock plate secured to the hub and rotatably receiving the inlet tube and engageable with the flange to hold the inlet tube in engagement with the O-ring; and said outlet tube including; a mounting chimney connected to the hub, a mounting ear formed integral with the mounting chimney and secured to the hub to secure the outlet tube to the hub, a radial tube having one end formed integral with the mounting chimney and communicating therewith, a surface tube having one end formed integral with the radial tube and being adjacent to the hose support surface, and said surface tube having a male hose fitting for receiving a female hose fitting of a hose supported on the reel.]

[14. A hose support apparatus for windably storing an elongaged flexible hose as defined in claim 1:

wherein the hub of said one of said sides having a journal on its outer side and an outlet mount on its inner side;

said inlet tube having; a horizontal tube rotatably mounted in the journal, a flange formed integral with the horizontal tube and engageable with the journal, and an outer tube having one end formed integral with the horizontal tube and the other end being adapted for connection to an inlet hose;

including an O-ring mounted within the journal and in engagement with the horizontal tube to form a seal therebetween, and a lock plate secured to the end of the journal and engageable with the flange to hold the inlet tube in place; and said outlet tube including; a mounting chimney mounted on the outlet mount, a mounting ear formed integral with the mounting chimney and secured to the outlet mount for securing the outlet tube to be outlet mount, a radial tube having one end formed integral with the chimney and communicating with the inlet tube through the chimney, a surface tube having one end formed integral with the radial tube and adjacent to the radial support surface, and said surface tube having a male hose fitting for receiving a female hose fitting of a hose windably stored on the reel;

and including a crank secured to the hub of the other of said sides.]

[15. A hose storage apparatus for storing and transporting a flexible hose comprising:

a frame a reel rotatably mounted on the frame for holding a flexible hose, a handle pivotally attached to the frame and being positionable from an upright position to a lowered position to facilitate storage of the hose storage apparatus, and a lock for releasably securing the handle in a selected position.]

16. A hose storage apparatus for storing and transporting a flexible hose as defined in claim [15] *20*, including a pair of wheels mounted on the frame for transporting the storage apparatus, said wheels being positioned adjacent to one edge of the frame which is adjacent to the uppermost portion of the handle when the handle is in its upright position.

[17. A hose storage apparatus for storing and transporting a flexible hose as defined in claim 15, wherein the handle includes a portion engageable with the frame when the handle is in its upright position.]

[18. A hose storage apparatus for storing and transporting a flexible hose as defined in claim 15, wherein the handle includes a portion engageable with the frame when the handle is in its lowered position.]

[19. A hose storage apparatus for storing and transporting a flexible hose, as defined in claim 15, wherein the lock holds the handle in an upright position.]

20. [A hose storage apparatus for storing and transporting a flexible hose, as defined in claim 15, wherein the frame includes a pair of sides,] *A hose storage apparatus for storing and transporting a flexible hose comprising:*

*a frame,*

*a reel rotatably mounted on the frame for holding a flexible hose,*

*a handle pivotally attached to the frame and being positionable from an upright position to a lowered position to facilitate storage of the hose storage apparatus,*

*a lock for releasably securing the handle in a selected position, wherein the frame includes a pair of sides,* each of said sides has a handle ear formed integral with the uppermost portion of the respective side;

said handle includes a pair of lateral bars, each of said bars is pivotally attached to a respective handle ear, an upright formed integral with each of the lateral bars, and a holding handle connecting the uprights, wherein the handle [being] *when* positioned in its upright position has the lateral bars in contact with the frame, and positioning of the handle in its lowered position places the opposite side of each of the lateral bars in contact with the frame and a portion of each of the uprights in contact with a frame.

21. [A hose storage apparatus for storing and transporting a flexible hose as defined in claim 15,] *A hose storage apparatus for storing and transporting a flexible hose comprising:*

*a frame,*

*a reel rotatably mounted on the frame for holding a flexible hose,*

*a handle pivotally attached to the frame and being positionable from an upright position to a lowered position to facilitate storage of the hose storage apparatus,*

*a lock for releasably securing the handle in a selected position,* wherein said frame includes a pair of trapazoidal frame sides.

each of the sides has a handle ear formed integral with the uppermost portion of the side;

including a pair of wheels connected to the frame;

said handle includes a pair of lateral bars, each lateral bar being pivotally connected to a respective handle ear, an upright formed integral with each of the lateral bars, and a holding bar connected to the uprights;

said lock releasably securing the handle in its upright position, whereby the handle in its upright position has one side of its lateral bars in contact with the respective frame sides and the handle bar on the same side of the frame has the wheels, and positioning of the handle to a lowered position having the opposite side of the lateral bars in contact with the frame sides and the uprights adjacent to the frame sides.

22. A hose storage apparatus for windably storing an elongated flexible hose comprising:

a frame including a pair of molded polyethylene sides, each of said sides being generally trapazoidal, each side having a head portion adjacent to its upper portion, a reel journal recetacle formed integral with each head portion, a handle ear formed integral with the upper portion of each side, a cross bar connecting the sides, a pair of wheels rotatably mounted adjacent to one end of the frame;

a U-shaped molded polyethylene handle having a pair of lateral bars, each of said lateral bars being pivotally connected to a handle ear of a frame side, an upright connected to each of the lateral bars, a holding bar connected to the uprights, said handle being pivotal from an upright attitude to a lowered position whereby the uprights are positioned adjacent to the side frames to facilitate storage, a handle lock for releasably securing the handle in an upright attitude;

a reel rotatably mounted in the frame said reel including a pair of identical molded polyethylene reel halves each reel half side including a reel side, each reel side including a journal on its exterior side and an outlet mount on its interior side, each reel side having a plurality of pylons formed integral therewith, each pylon of each side being secured to a like pylon of the other reel side to complete the reel, said pylons providing a hose support surface;

a hose connector in communication with one of the reel sides, said hose connector including molded polyethylene inlet tube having a horizontal tube rotatably mounted within the journal of the one reel side, said inlet tube including an outer tube formed integral with the horizontal tube and in communication therewith, said outer tube being adapted for connection to an inlet hose, and a flange formed integral with the horizontal tube and engageable with the journal;

an O-ring mounted on the horizontal tube within the journal to form a seal therebetween;

a lock plate secured to the journal for holding the inlet tube in the journal;

said hose connector including a molded polyethylene outlet tube fixed to the outlet mount of the reel side, said outlet tube including a mounting chimney on the outlet mount.

said outlet tube including a mounting ear formed integral with the mounting chimney for securing the outlet tube to the outlet mount, a radial tube having one end formed integral with the mounting chimney and communicating with the inlet tube through the mounting chimney and the outlet mount, a surface tube having one end formed integral with the radial tube and communicating with the inlet tube, and a male hose fitting formed integral with the surface tube for communication with a hose windably mounted on the reel;

and a molded polyethylene crank having a mounting plate secured to the exterior side of the other of said reel sides, said crank including a crank arm formed integral with the mounting plate and a crank handle formed integral with the crank arm.

[23. A hose storage apparatus for windably storing an elongated flexible hose comprising:

a frame, a reel for windably receiving an elongated flexible hose, said reel being formed of a moldable plastic material, said reel including a pair of connected reel sides, each of said reel sides including a hub rotatably mounted in the frame rotatably supporting the reel in the frame, said reel including a hose support surface between the reel sides, an inlet tube having a portion rotatably mounted in the center of the hub of one of said sides, an outlet tube having one end adapted for attachment to a hose windably mounted on a hose support surface, said outlet tube fixed relative to the hose support surface, said outlet tube being connected to the inlet tube to receive a fluid delivered to the inlet tube, said inlet tube including a horizontal tube rotatably mounted in the respective hub and being aligned with the axis of rotation of the hub and the reel, a flange formed integral with the horizontal tube holding the tube in one direction relative to the respective hub, an outer tube formed integral with the horizontal tube, said outer tube being adapted for connection to an inlet hose for receiving a fluid, and a lock plate connected to the hub and holding the flange to hold the inlet tube in the hub but allow the hub to rotate relative to the inlet tube.]

[24. A hose storage apparatus for windably storing an elongated flexible hose as defined in claim 23, wherein said reel is formed of two identical halves.]

[25. A hose storage apparatus for windably storing an elongated flexible hose as defined in claim 23 including:

a crank secured to the hub of the other said side for rotating the reel in the frame.]

[26. A hose storage apparatus for windably storing an elongated flexible hose as defined in claim 23, wherein each of the reel sides has a plurality of pylons formed integral with the sides, and fastening means securing the pylons of one of the sides to the pylons of the other of the sides to form the reel.]

*27. A portable garden hose cart for windably holding a garden hose and for use in transporting said garden hose between a storage location and a use location, said cart comprising:*

*a frame including a pair of generally vertical sides each of which has a bearing with a bearing surface;*

*a reel for windably receiving said garden hose disposed between said frame sides, said reel including a pair of reel sides and a hose support surface extending between the sides, each reel side including a generally horizontally extending hub, each hub being rotatably received in the corresponding bearing surface of its associated frame side;*

*an outlet tube carried by said reel for rotation therewith and having an end adapted for attachment to an end of the garden hose;*

*an inlet tube mounted in one of said hubs so that said inlet tube does not rotate with said reel with said inlet tube and said outlet tube being in fluid communication; and*

*circular resilient sealing means in sealing engagement with both said inlet tube and a component rotatable with said reel, said sealing means being retained inside said one of said hubs substantially vertically aligned with the bearing surface of the frame side holding that hub.*

*28. A cart as set forth in claim 27 further comprising a wheel pivotally carried by said frame for use in rolling said cart between said locations.*

*29. A cart as set forth in claim 27 wherein said frame and said reel are formed of a moldable plastic.*

*30. A cart as set forth in claim 27 wherein said sealing means comprises an O-ring.*

*31. A cart as set forth in claim 30 wherein said inlet tube has an outside surface having a circumferential groove seating said O-ring.*

*32. A cart as set forth in claim 31 wherein said hub has an inside surface rotatably engaging said O-ring.*

*33. A cart as set forth in claim 27 wherein said inlet tube has a flange and said apparatus further comprises a lock plate connected to said one of said hubs and holding said flange to retain said inlet tube in that hub and to allow that hub to rotate relative to said inlet tube.*

*34. A portable garden hose cart for windably holding a garden hose and for use in transporting said hose between a storage location and a use location, said cart comprising:*

*a frame including a pair of generally vertical sides each of which has a bearing with a bearing surface;*

*a reel for windably receiving said garden hose disposed between said frame sides, said reel including a pair of reel sides and a hose support surface extending between the sides, each reel side including a generally horizontally extending hub, each hub being rotatably received in the corresponding bearing surface of its associated frame side;*

*conduit means for transporting water to said hose and carried by said reel for rotation therewith and having an end adapted for attachment to an end of the garden hose;*

*a horizontal inlet tube mounted in one of said hubs so that said inlet tube does not rotate with said reel, said conduit means comprising an outlet tube extending from adjacent said one of said hubs past said hose support surface, and said conduit means further including a horizontal extension in said hub telescopically receiving said inlet tube; and*

*an O-ring in sealing engagement with both said inlet tube and said horizontal extension, said O-ring being retained inside said one of said hubs substantially vertically aligned with the bearing surface of the frame side holding that hub.*

* * * * *

UNITED STATES PATENT AND TRADEMARK OFFICE

CERTIFICATE OF CORRECTION

PATENT NO. : Re. 32,510

DATED : September 29, 1987

INVENTOR(S) : Cosmo N. Tisbo et al.

It is certified that error appears in the above-identified patent and that said Letters Patent is hereby corrected as shown below:

Column 1, line 15, change "application" to --applications--.

Column 1, line 29, change "Patent" to --patent--.

Column 2, line 3, change "instance" to --instances--.

Column 2, line 6, change "Thuse" to --Thus--.

Column 2, line 48, change "cross sectional" to --cross-sectional--.

Column 2, line 56, change "cross sectional" to --cross-sectional--.

Column 2, line 58, change "cross sectional" to --cross-sectional--.

Column 2, line 65, change "cross sectional" to --cross-sectional--.

Column 3, line 1, change "cross sectional" to --cross-sectional--.

Column 3, line 6, change "cross sectional" to --cross-sectional--.

Column 3, line 10, change "cross sectional" to --cross-sectional--.

UNITED STATES PATENT AND TRADEMARK OFFICE

CERTIFICATE OF CORRECTION

PATENT NO. : Re. 32,510

DATED : September 29, 1987

INVENTOR(S) : Cosmo N. Tisbo et al.

It is certified that error appears in the above-identified patent and that said Letters Patent is hereby corrected as shown below:

Column 3, line 26, change "polyethlene" to --polyethylene--.
Column 3, line 53, change "apetures" to --apertures--.
Column 4, line 37, change "apeture" to --aperture--.
Column 4, line 43, change "fastner" to --fastener--.
Column 4, line 66, change "apeture" to --aperture--.
Column 5, lines 7-8, change "apeture" to --aperture--.
Column 7, line 16, change the period to a comma.
Column 8, line 46, change the period to a comma.
Column 10, line 8, change "be" to --the--.
Column 11, line 25, change "trapazoidal" to --trapezoidal--.
Column 11, line 26, change the period to a comma.
Column 11, line 49, change "trapazoidal" to --trapezoidal--.
Column 12, line 3, after "frame" insert a comma.
Column 12, line 5, after "halves" insert a comma.
Column 12, line 35, change the period to a comma.

Signed and Sealed this

Twenty-third Day of February, 1988

*Attest:*

*Attesting Officer*

DONALD J. QUIGG

*Commissioner of Patents and Trademarks*